Sept. 8, 1970     I. C. GOLDBERG     3,527,464
SEAL DEVICE FOR DRIVING SHAFT OF PUMP UNIT
Filed Oct. 17, 1967     3 Sheets-Sheet 1
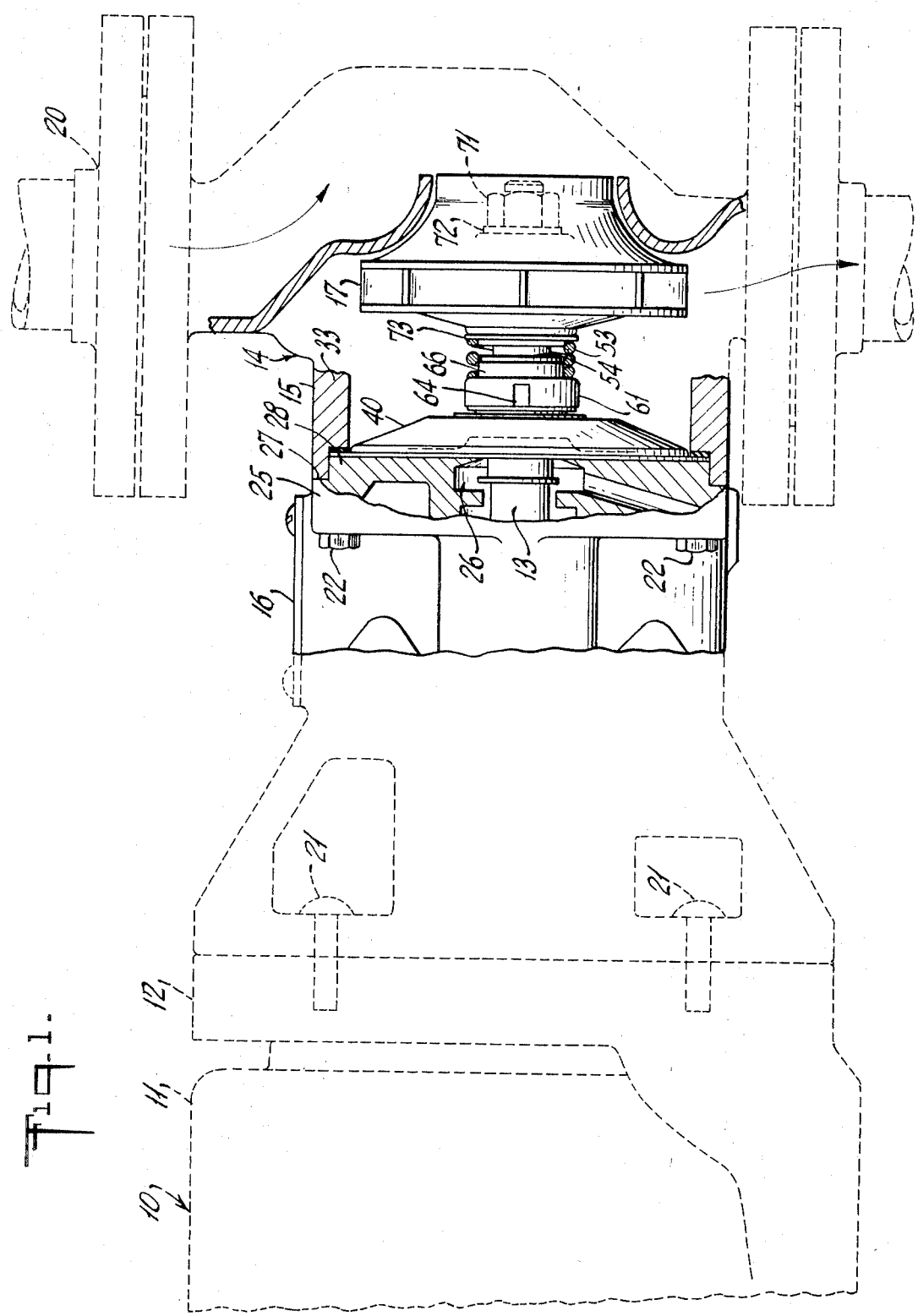
INVENTOR
IRWIN C. GOLDBERG
BY
Burgess, Ryan & Hicks
ATTORNEYS

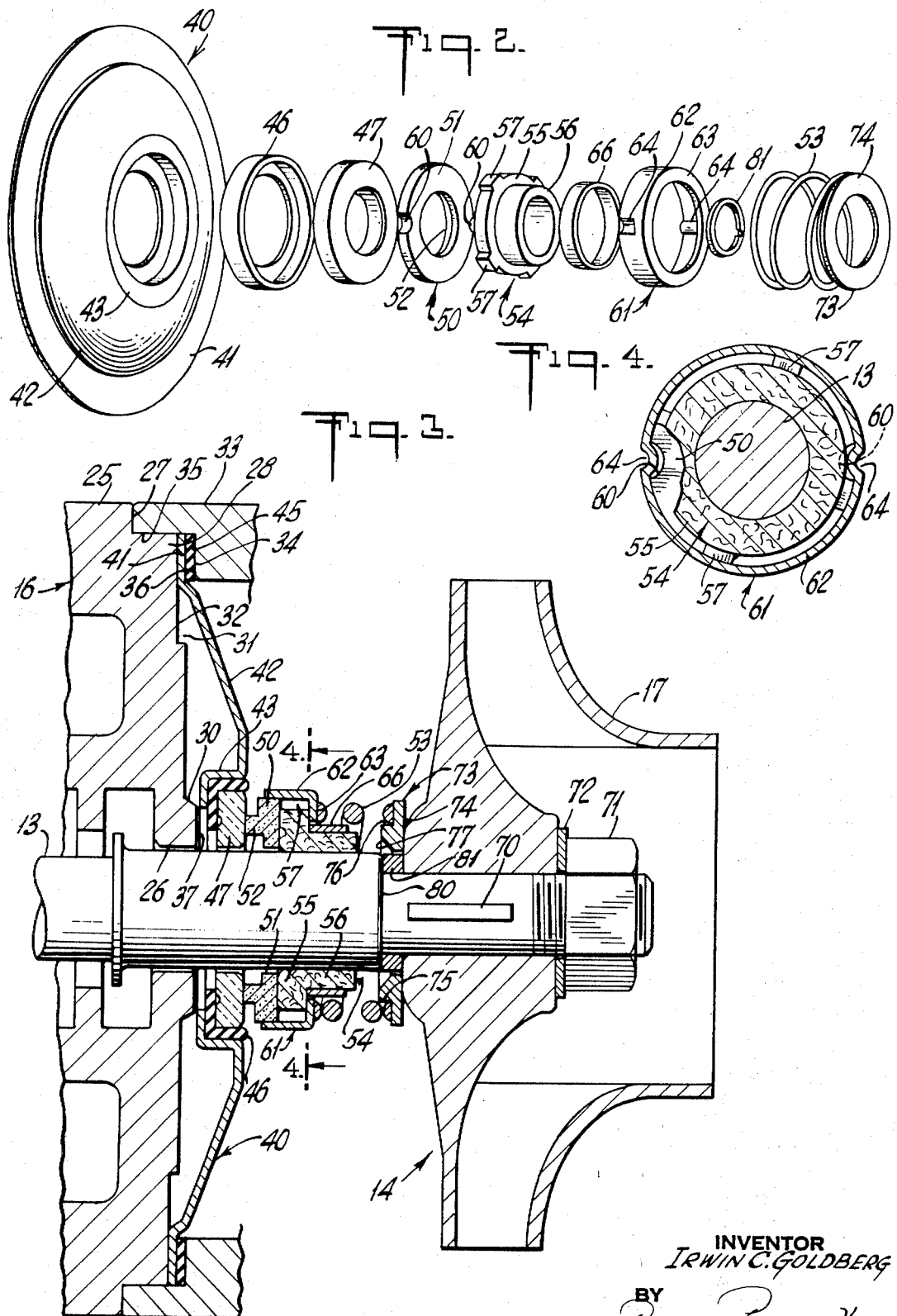

Sept. 8, 1970    I. C. GOLDBERG    3,527,464
SEAL DEVICE FOR DRIVING SHAFT OF PUMP UNIT
Filed Oct. 17, 1967    3 Sheets-Sheet 3
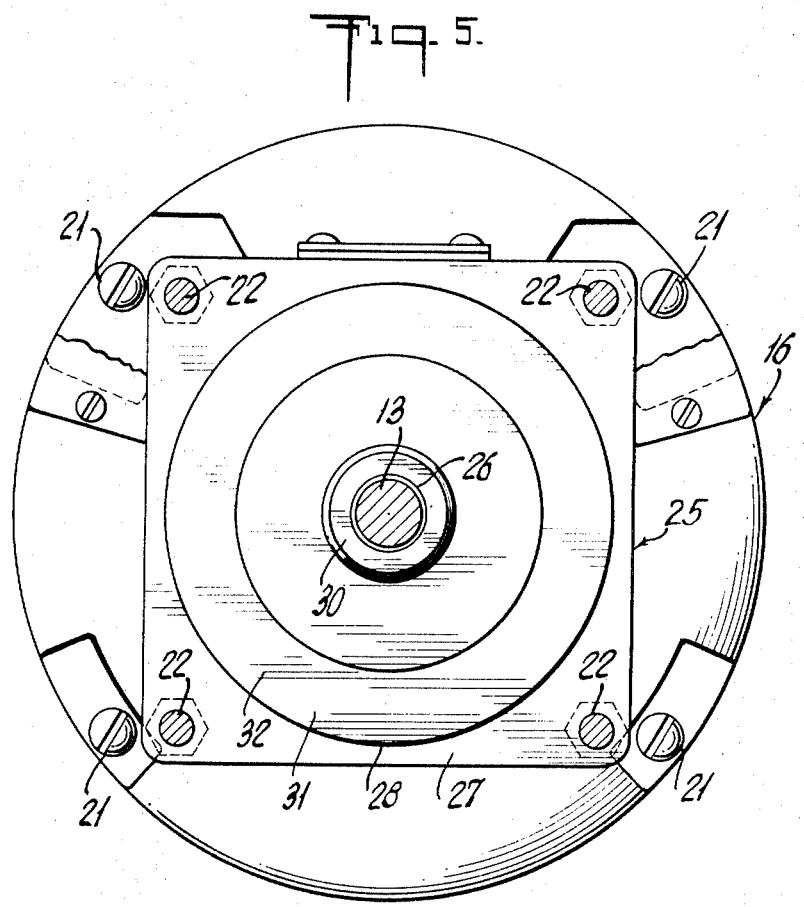
INVENTOR
IRWIN C. GOLDBERG
BY
Burgess, Ryan & Hicks
ATTORNEYS

3,527,464
SEAL DEVICE FOR DRIVING SHAFT OF PUMP UNIT
Irwin C. Goldberg, 171 Whitman Drive, Brooklyn, N.Y. 11234
Filed Oct. 17, 1967, Ser. No. 675,924
Int. Cl. F16j 9/00, 15/00
U.S. Cl. 277—9                               8 Claims

ABSTRACT OF THE DISCLOSURE

The invention pertains specifically to a seal device for a booster pump unit of the type having a cast iron bearing bracket for the pump shaft. The bearing bracket may be of conventional construction now in use, presenting a seal face at one end against which a seal assembly presses. The seal device of the present invention dispenses with the use or the necessity of servicing the seal face on the bearing bracket, and for that purpose includes a shield plate of non-corrosive material, which can be sealably clamped to protectively cover the seal face of the bearing bracket. This shield plate has retainer means for the base section of the seal device, and in place of the metal seal face described, the seal device of the present invention includes a seat member in the form of a ring, fitted in the seal retainer means around the pump shaft and presenting a seal face taking the place of the metal seal face.

---

The present invention relates to a booster pump unit and more particularly, to a seal device for the driving shaft of such a unit.

In a known centrifugal booster pump unit of the small type, there is provided a motor enclosed in a housing frame, a shaft driven from said motor and connected to a pump impeller for driving said impeller from the motor, a pump body housing said impeller, and a bearing assembly for said shaft between said motor frame and said pump body including a bearing bracket. The bearing bracket, which is cast iron, is removably connected to the pump body to permit servicing, and has an end wall forming part of the bracket casting and adapted to sealably close the open end of the pump body to prevent liquid from escaping from the pump chamber through the bearing assembly. The part of this bracket end wall through which the pump shaft extends is sealed by a spring-pressed seal assembly inside the pump body which bears against a seal face on the end wall of the bearing bracket. This seal face becomes pitted and scored by corrosion and wear, and requires the pump unit to be serviced by disassembling it to expose the seal face, and by filing or otherwise refinishing this seal face to provide a flat, smooth sealing surface.

One object of the present invention is to provide a seal device, which can be employed either as a replacement unit or as an original installation in connection with the type of bearing bracket described, and which avoids the refinishing procedure now required in servicing this type of bearing bracket.

In accordance with certain features of the present invention, the seal device comprises a shield plate made of noncorrosive material, such as bronze, and designed to be placed directly over the end wall of the bearing bracket casting and to be sealably clamped thereto in stationary position. This shield plate has a hub center through which the pump shaft extends and this center has a retainer conformation to receive an annular stationary seat member, which forms part of the seal assembly, and which serves the function of the seal face on the hub section of the end wall of the known bearing bracket casting.

The new and improved seal device described can be applied to the bearing bracket of the present existing type of pump unit as part of an original installation, or may form part of a repair kit to be used for servicing purposes, without the necessity of filing or otherwise refinishing any seal surface on the bearing bracket or any part of the seal device.

Various other objects, features and advantages of the present invention are apparent from the following description and from the accompanying drawings, in which:

FIG. 1 is a side view partly in section and partly in broken lines indicating known parts, and shows the seal assembly of the present invention;

FIG. 2 is an exploded view of the seal assembly embodying the present invention and shows its components in separated position and in the relation in which they are brought together for assembly;

FIG. 3 is a detail section of the seal assembly shown in mounted operative position in relation to the impeller and the bearing bracket;

FIG. 4 is a section of the seal assembly taken on lines 4—4 of FIG. 3, and

FIG. 5 is an end view of the bearing bracket.

Referring to the drawings, the pump unit to which the seal device of the present invention can be applied comprises an electric motor 10 having a frame 11, constituting a housing for the motor and provided with an end mounting bell or plate 12, and an output shaft (not shown), having a driving connection through a flexible coupling (not shown) to a shaft 13 of a centrifugal pump 14. The pump 14 has a pump body 15 closed at one end and open at its opposite inner end, and between this inner end of the pump body and the motor frame 11 is a bearing bracket 16, adapted to house the bearing and coupling assembly (not shown) for supporting the pump shaft 13, and for connecting it to the motor shaft. Connected to the pump shaft 13 and forming part of the pump 14 is an impeller 17 inside the pump body 15.

The pump unit described is connected to a liquid pipe line 20, which may have a valve (not shown) and the suction passageway in the pump body 15 from the pump line on one side of the pump 14 to the eye of the impeller 17, and the pressure passageway from the periphery of the impeller to the pump line on the other side of the pump, may be as shown.

The three main components of the pump unit, namely the motor 10, the bearing bracket 16 and the pump 14, are detachably connected together end to end to permit separation for servicing. For that purpose, the mounting plate 12 of the motor frame 11 is connected to one end of the bearing bracket 16 by means of studs 21, and the other end of the bearing bracket is connected to the inner end of the pump body 15 by studs 22.

The bearing bracket 16 is of cast iron and has a wall 25 at one end, defining a mounting flange of substantially rectangular outline as shown in FIG. 5, and having a center circular hole 26 through which the pump shaft 13 centrally extends. This bracket wall 25 has a peripheral recess 27 defining a cylindrical boss 28 concentric with the shaft hole 26, and has a circular raised hub portion 30 at its center concentric with said shaft hole. A circular peripheral recess 31 on the boss 28 forms an annular seat 32 for a gasket. With the different recesses and raised portions described, the face of the end bracket wall 25 has a stepped conformation with the highest portion at the center.

The pump body 15 has a skirt 33 at its inner end of rectangular outline, corresponding to the rectangular outline of the bearing bracket wall 25 to effect conforming registry of the two outlines in interconnected positions of the bearing bracket 16 and the pump body 15, and this skirt has an internal recess 34 with a cylindrical surface 35 adapted to embrace the boss 28 on the bracket wall 25 with a snug slide fit and an annular shoulder 36 adapted to overlie the peripheral section of the annular seat 32 on said boss in interconnected positions of the bearing bracket 16 and the pump body 15, to form a rabbet joint therebetween.

The construction of the pump unit so far described by reference to the drawings is of known commercial construction, and consequently, per se, forms no part of the present invention. In this known commercial construction, the end surface 37 of the raised central hub portion 30 of the bearing bracket wall 25 is finished to form an annular metal seal face which is flat and smooth. In this known construction, a seal assembly (not shown) between the impeller 17 and this end surface 37 prevents liquid in the pump 14 from escaping along the pump shaft 13 through the shaft hole 26, and for that purpose, includes at its base a carbon seal in the form of a collar, embracing the motor shaft 13 with a tight sealing fit for rotation therewith and pressed against said seal face by a coil spring encircling said shaft.

The outer surface of the end wall 25 of the bearing bracyet 16 extending beyond the carbon seal is in communication with the interior of the pump body 15 and is exposed to the liquid therein. Thus, both the seal face and the end wall of the bracket are subject to the corrosive effects of the liquid which comes into contact therewith. As a result, the seal face may become pitted and scored to such an extent that an effective seal cannot be maintained and the end wall may actually be eaten away by corrosion.

In order to replace a water seal on a booster pump, it is necessary to reface the seal surface and this requires specialized equipment and considerable skill to achieve a perfectly lapped surface, for mating with a replacement seal assembly. Thus, repair of a leaking pump, as an "on the job repair" is generally not possible due to the repairman's lack of equipment, such as, a lathe, surface grinder and lapping tools, all necessary in order to produce a perfectly flat seal surface. Also, after a number of seal repairs, the cast iron seal surface will have been refaced to a point where it is non-repairable and worthless.

The present invention constitutes a seal device, which can be easily substituted for the known seal assembly described, either in the operation of servicing the known commercial pump unit or as part of an original installation, and which dispenses with the necessity of refinishing the end surface 37 of the raised hub portion or of any metal seal surface. At the same time, it protects the end face of the bracket from corrosion.

The improved seal device of the present invention comprises a stationary shield 40 for the cast metal end surface of the bearing bracket 16 in the form of a circular plate, made of non-corrosive metal, preferably bronze, and stamped or otherwise shaped to define a flat peripheral rim 41, a dished annular section 42 gradually rising from said rim, and a center depressed annular section 43 defining a seal retainer cup with a bottom wall having a hole through which the pump shaft 13 extends with clearance. The plate 40 overlies the end surface of the bearing bracket 16 with the rim 41 seated on the seat 32 on said end surface and clamped between said seat and a gasket 45, which in turn is clamped between said rim and the shoulder 36 on the skirt 33 of the pump body 15.

With the shield plate 40 fitted in operative position shown, the bottom of the seal retainer cup 43 just about clears the raised hub portion 40 of the bearing bracket wall 25. Inside the cup 43 is a stationary seat ring 46 of resilient material, such as rubber and more specifically neoprene, lining the walls of said cup, and seated in said ring is a stationary seat member 47, made of suitable rigid non-metallic sealing material, such as ceramic, and specifically alumina, and lapped at its outer side to form a seal face. The seat ring 46 and the seat member 47 are apertured to permit the pump shaft 13 to pass therethrough with clearance, and are dimensioned, so that the seat ring 46 is clamped tightly between the walls of the cup 43 and the seat member and forms an effective seal against leakage of liquid along the walls of the cup from the pump body 15 to the bearing bracket 16.

Bearing with spring-pressure against the seal face of the stationary ceramic seat member 47 with sealing contact is a seal ring 50, desirably of carbon, encircling the pump shaft 13. This carbon seal ring 50 has a main ring section 51 and an annular rib 52, projecting axially from the inner face thereof and sealably pressing against the ceramic seat member 47, and is mounted for rotation with the pump shaft 13, and for slide movement therealong under the action of a coil spring 53. To form a connection between the carbon seal ring 50 and the pump shaft 13 for the purpose described, there is provided an annular grommet 54 of yieldable material, such as neoprene, embracing the pump shaft 13 with a tight sealing fit, permitting said grommet to flex in an axial direction relative to the shaft under the action of the coil spring 53. This grommet 54 has an annular shoulder section 55 seated against the seal ring 50 and a neck section 56 extending along the pump shaft 13. Radiating from the periphery of the shoulder section 55 of the grommet 54 are a number of spacing fingers 57, four being shown equally spaced circumferentially which tend to increase the flexibility of the shoulder. For interlocking the seal ring 50 and the grommet 54 for rotation in unison, the periphery of the seal ring 50 has a number of notches 60, two being shown positioned diametrically opposite each other. An annular shell 61, and which is made of non-corrosive metal, such as brass, has a peripheral skirt wall 62 embracing the seal ring 50 and the grommet 54 with a tight fit and has an end flange 63 overlying the peripheral section of said grommet. The peripheral shell wall 62, has two radially inward depressions 64 forming respective projections adapted to fit into the notches 60 in the periphery of the seal ring 50 to lock the shell 61 to the seal ring for rotation together.

A collar 66 of non-corrosive metal, such as brass, embraces the neck section 56 of the grommet 54 with a tight fit to clamp this neck section sealably around the pump shaft 13, to ensure thereby the rotation of the grommet 54 with said shaft, while permitting said grommet to flex relative to the shaft under the action of the coil spring 53.

The impeller 17 is keyed to the pump shaft 13 by means of a key 70 and is removably retained thereon by a nut 71 bearing against a washer 72 and screwed on to the threaded end of said shaft.

The coil spring 53 presses the carbon seal ring 50 against the seat member 47 and bears at one end against the end flange 63 of the lock 61 and at the other end is attached to a spring retainer 73 in the form of a ring, in face contact with the inner end of the impeller 17. The spring retainer 73 is made of non-corrosive metal, such as brass, and has a flat surface 74 on its outer side bearing against the impeller 17. The inner side of the spring retainer 73 has a peripheral recess 75 to receive one end of the coil spring 53 and this recess has a cylindrical wall 76 embraced by the spring with a friction fit to removably attach the spring retainer to the spring.

Also, the inner side of the spring retainer 73 is formed with a conical cavity 77, serving to center this retainer and in turn the coil spring 53 in relation to the pump shaft 13, in fully compressed condition of the coil spring shown in FIG. 3. The pump shaft 13 is reduced at its outer end section to form an annular shoulder 80, and spacer 81 of non-corrosive metal, such as brass, encircling this reduced shaft section and seating on said shoulder, forms a platen for the spring retainer 73 in the fully compressed condition of the coil spring 53 shown in FIG. 3. The conical walls in the retainer cavity 77, causes the spring retainer 73 to cam itself into center position in relation to the pump shaft 13 by its engagement with the spacer 81, as the nut 71 is tightened to bring the end of the impeller into engagement with the spacer.

With the seal assembly shown, the spring retainer 73, the coil spring 53 and the spacer 81 rotate with the pump shaft 13.

The seal device described consisting of the elements 40, 46, 47, 50, 54, 61, 66, 53, 73 and 81, may constitute the components of a repair kit for servicing the conventional commercial pump unit, when the metal end surface 37 of the raised hub portion 30 of the end bearing bracket wall 25, which acts as a seal face, has become pitted or scored. The end wall of the bracket can also become corroded to such an extent that replacent is required and this condition will also be corrected by utilizing a shield in accordance with the present invention. To service such a pump unit, it is not necessary to refinish this end bracket wall surface 37, but the unit can be quickly and effectively put into good operative condition by merely shielding the entire end surface of the cast iron bearing bracket 16 with the bronze plate 40 and assembling the rest of the seal device of the present invention, as shown in FIG. 3.

If desired, the seal device of the present invention may be applied to new pump units having bearing brackets of the type described.

While the invention has been described with particular reference to a specific embodiment, it is to be understood that it is not to be limited thereto but is to be construed broadly and restricted solely by the scope of the appended claims.

What is claimed is:

1. In a replacement seal device for a centrifugal pump unit having a pump shaft, an impeller, and a pump body housing said impeller and part of said pump shaft and open at one end, and a bearing bracket supporting said shaft detachably connected to said pump body, said bracket having an end wall closing the open end of said pump body and being provided with an opening to permit said pump shaft to pass therethrough from the interior of said bearing bracket to the interior of said pump body, the improvement comprising a replaceable seal located between said end bracket wall and said impeller for preventing leakage of liquid from the interior of said pump body to the bearing bracket and for shielding said bracket end wall from contact with the liquid from said pump body, said seal including a stationary shield for said bearing bracket in the form of a plate of non-corrosive material, sealably clamped peripherally between the open end of said pump body and said bracket end wall and covering the outer side of said bracket end wall closest to said pump body, said plate having an opening through which said pump shaft extends from the interior of said bearing bracket to the interior of said pump body, said plate having an annular section extending around said opening and being shaped to define retainer means for the base end of said seal, an annular stationary seat member sealably mounted in said seal retainer means and apertured to permit the pump shaft to pass therethrough, said seat member presenting a seal face on its outer side, a seal ring encircling said shaft and having annular sealing contact with the seal face of said seat member, spring-pressed means for yieldably pressing said seal ring against said seat member, means connecting said seal ring to said shaft for driving said seal ring with said pump shaft, and means for sealing said shaft against leakage therealong from the interior of the pump body to said seal ring.

2. The improvement described in claim 1, said shield plate being of bronze and said seal retainer means thereon being in the form of a cup, said seat member being detachably fitted in said cup.

3. In a replacement seal for a centrifugal pump, the improvement as defined in claim 1 wherein said shield plate has an outer peripheral rim adapted to be sealably clamped between the bearing bracket and the pump body, said shield plate including a dished annular section rising from said rim, and a center depressed annular section in the form of a cup defining said seal retainer means.

4. The improvement described in claim 3, said means for connecting said seal ring to said shaft for driving said seal ring with said pump shaft comprising an annular grommet of yieldable material embracing said pump shaft with a slide sealing fit tight enough to cause said grommet to rotate with said pump, and seated on said seal ring, and a lock of rigid material in the form of an annular shell locked to said seal ring and to said grommet to cause said seal ring to rotate with said shaft, said spring-pressed means including a coil spring encircling said pump shaft and bearing on said grommet to press said seal ring yieldably against said seat member.

5. The improvement described in claim 4, said shield plate being of bronze, said seat member being of ceramic material and being detachably fitted in said cup, said seal ring being of carbon, and said lock being of metal.

6. The improvement described in claim 1, said spring-pressed means comprising a coil spring encircling said pump shaft with circumferential clearance, a spring retainer in the form of a ring attached to one end of said spring and encircling said pump shaft, said spring retainer being of rigid material and being pressed axially inward along said shaft by said impeller to compress said spring, said pump shaft carrying means forming an annular shoulder facing said impeller and located in position to be engaged by the inner side of said spring retainer when the spring is compressed for operation of the pump, said spring retainer on its inner side being formed with a substantially conical cavity defining a cam wall engaging said shoulder and causing said spring retainer to be centered with respect to said pump shaft by camming action.

7. A replacement seal for a water pump unit having a bearing bracket in which a motor driven pump shaft is journalled, which comprises:
  (a) an annular plate formed of a non-corrosive material and having a central opening formed therein to accommodate said pump shaft;
  (b) said plate having an outer peripheral edge and containing an annular depression surrounding said central opening;
  (c) said outer peripheral edge of said plate being adapted to be clamped in sealing engagement with an exposed surface of said bearing bracket;
  (d) said annular depression having a bottom extending over an exposed sealing surface formed on the bearing bracket and extending around the opening for the pump shaft formed therein;
  (e) non-rotating sealing means seated in said annular depression and forming a leak-proof seal therewith;
  (f) said non-rotating sealing means including a sealing ring having a smooth outwardly facing sealing surface;
  (g) a sealing member connected to said pump shaft for rotation therewith; and
  (h) spring means engaging with and urging said rotating sealing member into sealing engagement with the sealing face of said sealing ring.

8. A replacement seal for a water pump unit as defined in claim 7 wherein:
  (a) the non-rotating sealing means includes
  (b) a cup-like member of a resilient rubber-like material seated in said depression in the annular plate and forming a seal with opposing surfaces of the plate forming said depression; and (c) the sealing ring is formed of hardened material and is seated within said cup-like member in sealing engagement therewith.

References Cited
UNITED STATES PATENTS

| | | | |
|---|---|---|---|
| 2,466,026 | 4/1949 | Hardesty | 277—93 X |
| 3,123,364 | 3/1964 | Ennis | 277—9 X |
| 3,168,871 | 2/1965 | Sieghartner. | |
| 3,203,704 | 8/1965 | Mueller | 277—90 X |

SAMUEL ROTHBERG, Primary Examiner

U.S. Cl. X.R.

103—111; 277—1, 32, 90